United States Patent [19]
Grey et al.

[11] 4,215,263
[45] Jul. 29, 1980

[54] DRAWING OPTICAL WAVEGUIDES BY HEATING WITH LASER RADIATION

[75] Inventors: David S. Grey, Lexington, Mass.; Robert A. Wey, Horseheads, N.Y.

[73] Assignee: Corning Glass Works, Corning, N.Y.

[21] Appl. No.: 913,900

[22] Filed: Jun. 8, 1978

[51] Int. Cl.² .............................................. B23K 9/00
[52] U.S. Cl. ........................................ 219/121 L; 65/2
[58] Field of Search ................. 65/2, DIG. 7; 219/121 L, 121 LM

[56] References Cited

U.S. PATENT DOCUMENTS

| | | | |
|---|---|---|---|
| 3,865,564 | 2/1975 | Jaeger et al. | 65/DIG. 7 |
| 3,879,128 | 4/1975 | Presby | 65/2 |
| 3,981,705 | 9/1976 | Jaeger et al. | 65/2 |
| 3,990,873 | 11/1976 | Knetztstorfer | 65/2 |

*Primary Examiner*—C. L. Albritton
*Attorney, Agent, or Firm*—Walter S. Zebrowsi; Clarence R. Patty, Jr.; Richard E. Kurtz

[57] ABSTRACT

In drawing an optical waveguide, the blank is heated by a beam of laser radiation which has substantially zero power from the axis of the blank to a prescribed radial position and substantially uniform power from that position to a greater radial position. A rotating spinner splits radiation from the laser into two rotating beams, the paths of which are made to be non-intersecting with the axis of the blank being drawn. A conical reflector forms the radiation into a circumferential beam through which the blank passes.

10 Claims, 9 Drawing Figures

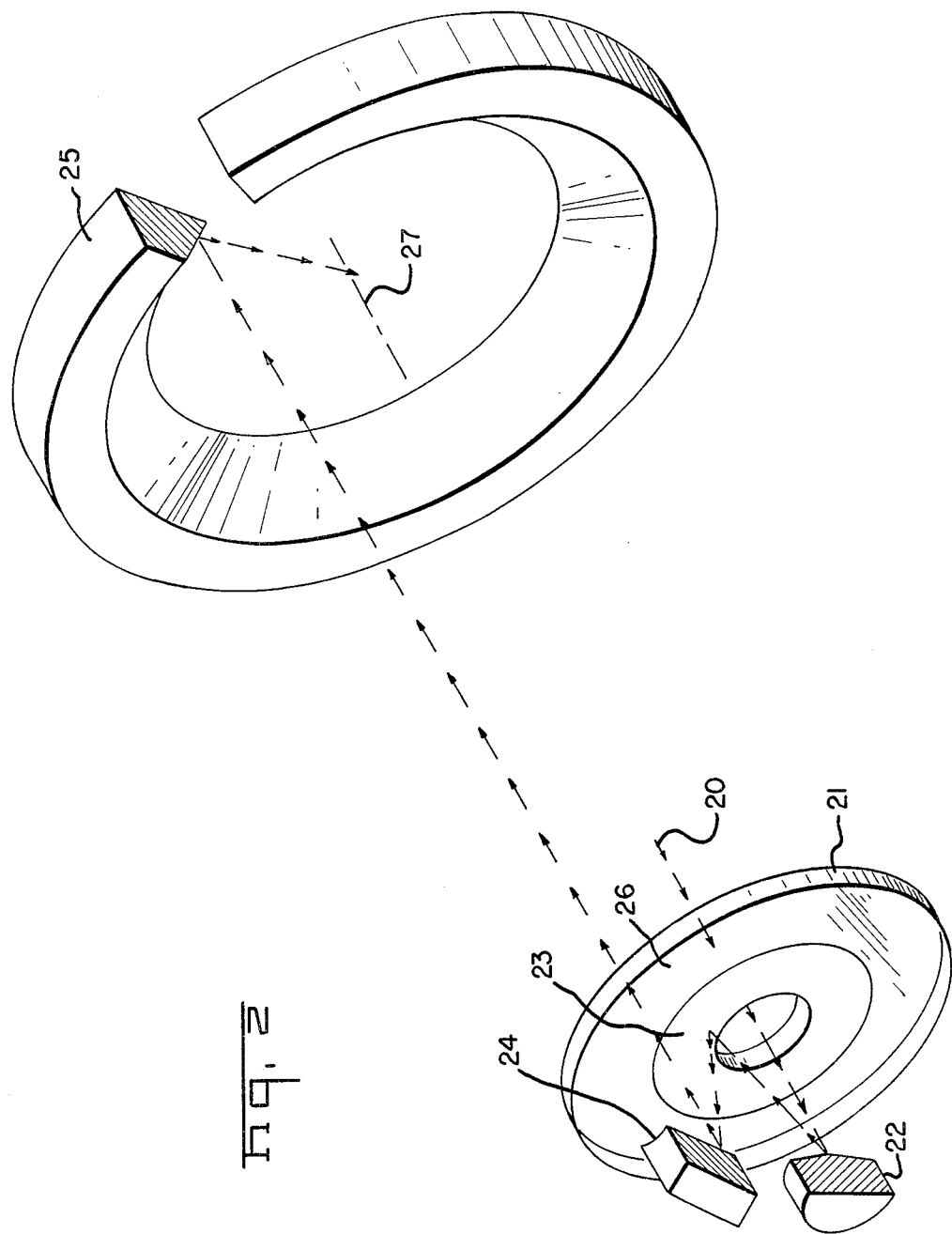

DRAWING OPTICAL WAVEGUIDES BY HEATING WITH LASER RADIATION

BACKGROUND OF THE INVENTION

This invention relates to methods of and apparatus for drawing optical waveguides, and more particularly to the use of laser radiation for heating the waveguide blank to the drawing temperature.

Waveguides used in optical communication systems are hereinafter referred to as "optical waveguides", and are normally constructed from a transparent dielectric material, such as glass or plastic. U.S. Pat. Nos. 3,711,262—Keck and Schultz and 3,775,075—Keck and Maurer describe techniques for making a blank which is heated and drawn into a waveguide having a uniform diameter.

U.S. Pat. No. 3,865,564—Jaeger and Logan suggests the use of laser radiation to heat the waveguide blank to the drawing temperature. The use of laser radiation has many advantages for this purpose. It is uniform, easily controlled and easily focused. In the Jaeger and Logan patent, an annular beam of laser radiation is formed. The annular beam is directed to a conical reflector which focuses the energy on the waveguide blank. A conical reflector is particularly suitable for focusing the energy on the blank. However, with the optical system of this patent, the energy is focused on the axis of the waveguide blank. This results in an inherent instability in the draw. As the glass diameter is reduced, the power density on the surface increases, thus lowering the viscosity and encouraging further diameter reduction. Furthermore, in this patent the blank is heated with a beam which has a power density distribution along the axis of the blank which is the same as the power density distribution of the original laser source. Heating of the blank can be accomplished more efficiently by having the power density highest where the blank diameter has not begun to attenuate.

It is an object of the present invention to provide laser radiation heating which is more stable and more efficient.

SUMMARY OF THE INVENTION

In accordance with this invention, a waveguide blank is heated to the drawing temperature by an annular beam of laser radiation which has substantially zero power from the axis of the blank to a prescribed radial position.

In order to produce such a beam, radiation from a laser is directed to a rotating reflector which splits the radiation into two beams which rotate about the axis of the waveguide blank. These beams are reflected onto paths which do not intersect the axis of the waveguide blank. The rotating beams of laser radiation are directed to a conical reflector through which the waveguide passes. The conical reflector focuses the energy into a circumferential beam which has substantially zero radiation from the axis of the waveguide blank to a prescribed radius. Such a beam provides more stable heating than the prior art wherein the energy is focused on the axis of the blank.

In accordance with another important aspect of this invention, two rotating reflecting surfaces in the optical path form a beam having a substantially uniform power distribution from the prescribed radius to a greater radius. This uniform power distribution promotes efficient heating. The curvature of these reflective surfaces can be circular, hyperbolic or any shape which produces a desired radial power density distribution.

In accordance with another important aspect of the invention, the laser radiation from the source is split into two beams by a rotating reflector which has two reflecting surfaces which join in a line intersecting the axis of the blank. This is referred to as a "rooftop" reflector. The shape of the surfaces are changed to produce a desired axial power distribution along the waveguide blank. One particularly suitable axial power distribution has a half Gaussian shape wherein the power is a maximum at the point where the blank diameter is reduced and falls in a Gaussian curve to zero on one side of this point.

The foregoing and other objects, features and advantages of the invention will be better understood from the following more detailed description and appended claims.

DESCRIPTION OF THE DRAWINGS

FIG. 2 shows a section of the rotating beam splitter, the reflective surfaces and optics for producing the annular beam;

FIG. 3 shows the rotating spinner in more detail;

DESCRIPTION OF A PREFERRED EMBODIMENT

Figure 1A:
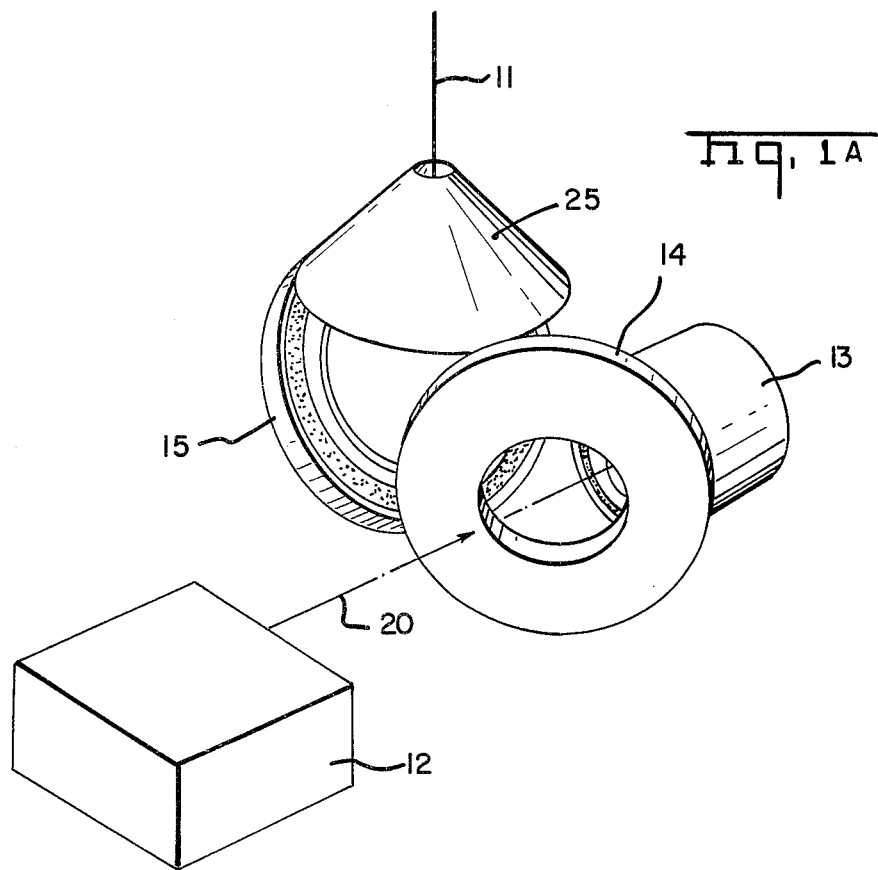
FIGS. 1A–1D show apparatus for drawing waveguides in accordance with this invention.

Referring to FIGS. 1A–1D, a substantially continuous glass blank 11 is transported through the laser optics of this invention by conventional means which are not shown. A source of laser radiation 12 emits a beam of laser radiation 20.

The beam of laser energy 20 is assumed to be collimated to within the normal divergence of the laser for which the invention is designed. One laser suitable for use is a continuous-wave $CO_2$ laser emitting at 10.6 $\mu$m, but the invention is not limited to this type of source. Only the principal (central) ray of the laser beam is used for illustration in FIGS. 1A–1D and 2.

A rotating reflector 13 splits the radiation into two beams which are rotating and which are on paths which do not intersect divergent the axis of the blank 11. The rotating beams are reflected from the annular mirrors 14 and 15 to the conical reflector 25. Conical reflector 25 forms a beam of laser radiation in a plane normal to the blank 11. This beam is circumferential with substantially zero power density from the axis of blank 11 to a prescribed radial position.

Figure 1B:
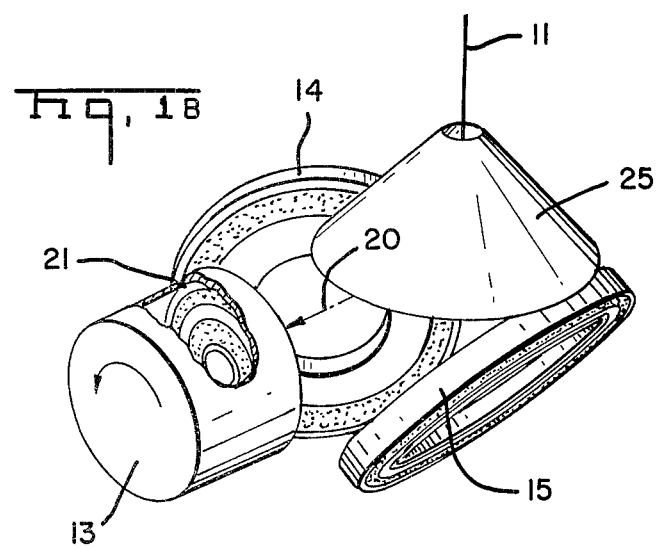
Figure 1C:
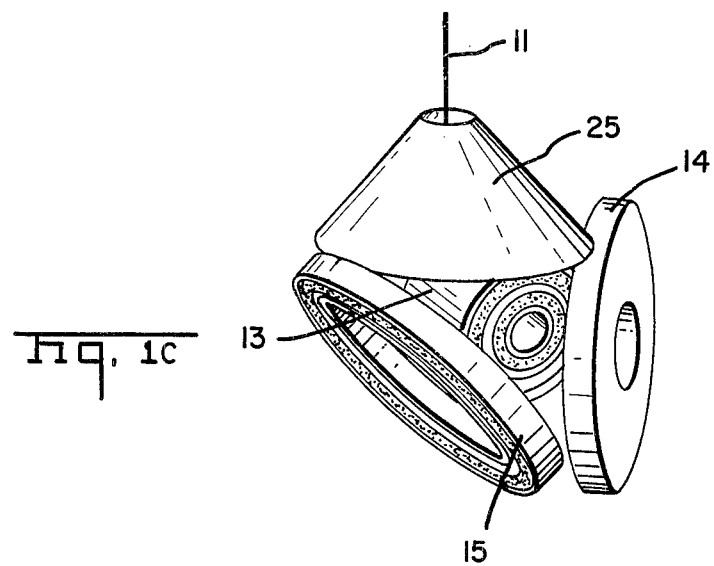
Figure 1D:
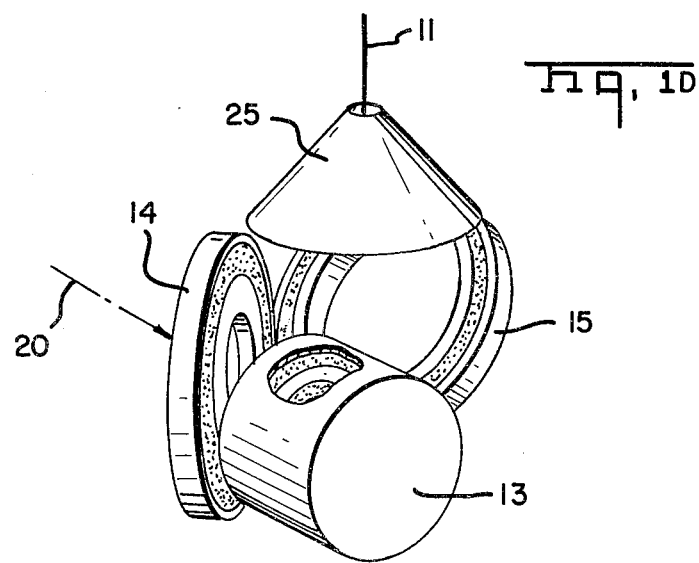
Figure 7:
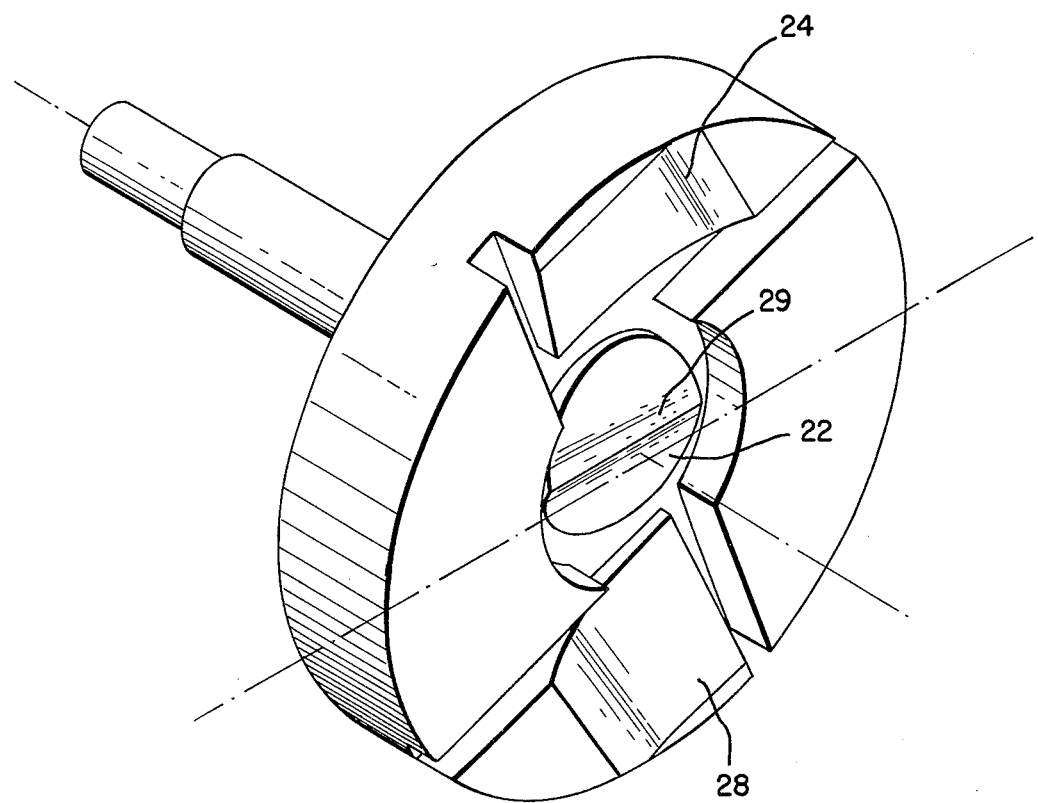

In FIGS. 1B and 1D, the rotating reflector 13 is broken away to show that it includes an annular element 21 which has reflective and transmissive rings. The rotating reflector 13 also includes a rooftop reflector 22 and reflective surfaces 24 and 28 which can be seen in FIGS. 2 and 3.

FIG. 2 shows the optics of the system without the two annular mirrors 14 and 15 which permit separation of the laser beam axis and the blank drawing axis. In FIG. 2, these two axes appear coincident which is an impossible situation but this facilitates understanding of the operation.

The beam 20 passes through a hole in optical element 21, which is, for example, a 4" diameter by ¼" thick piece of zinc selenide. The beam strikes the "rooftop" reflector 22 (shown in section), which directs one-half of the beam off-axis at a given angle and directs the other half off-axis at a similar but opposite angle. For clarity in this explanation, only the portion of the incoming laser beam which is directed upward will be considered, but it should be understood that the path to be described is duplicated by the lower half of the beam.

The beam, upon reflection from reflector 22, strikes an annular portion 23 of element 21 which has been coated with a reflective coating, such as aluminum. The reflected beam then strikes a cylindrical reflective surface 24. This surface is oriented such that the beam is reflected along a path which is not parallel to the original axis and, more importantly, can never intersect the original axis. This is the means by which a line focus at the axis of the conic reflector 25 is avoided.

The reflective surface 24 provides the desired axial power density distribution along the waveguide blank.

Upon reflection from reflective surface 24, the beam passes through transmissive annular portion 26 of element 21. The beam continues along this path until it strikes conic reflector 25 (shown in partial section). It is directed in the general direction of, but not precisely toward, the axis 27 of conic reflector 25. It eventually arrives at some point of nearest approach to the axis, which is depicted in FIGS. 2 as the termination of the path. Unless absorbed in this region, it continues in some unspecified path and is eventually dissipated due to diffuse reflections.

The optical waveguide and the glass blank from which it is drawn are arranged to be coaxial with the conic reflector. Since the invention precludes rays of laser energy from intersecting this axis, the system can be made to generate a cylindrical, or circumferential, zone centered on this axis in which negligible energy is present.

FIG. 3 shows rotating reflector, or spinner, 13 which includes rooftop reflector 22, cylindrical reflective surface 24 and an identical cylindrical reflective surface 28 located 180° from 24. Rooftop reflector 22 has two surfaces which join in a line 29 which intersects the axis.

The rotation of this element at a high speed (typically 10,000 rpm) causes the beam path shown in FIG. 2 and its complementary path to be projected to all points on the conic reflector 25. Thus, a completely circumferential and essentially constant illumination of the glass blank is obtained.

Figure 4A:
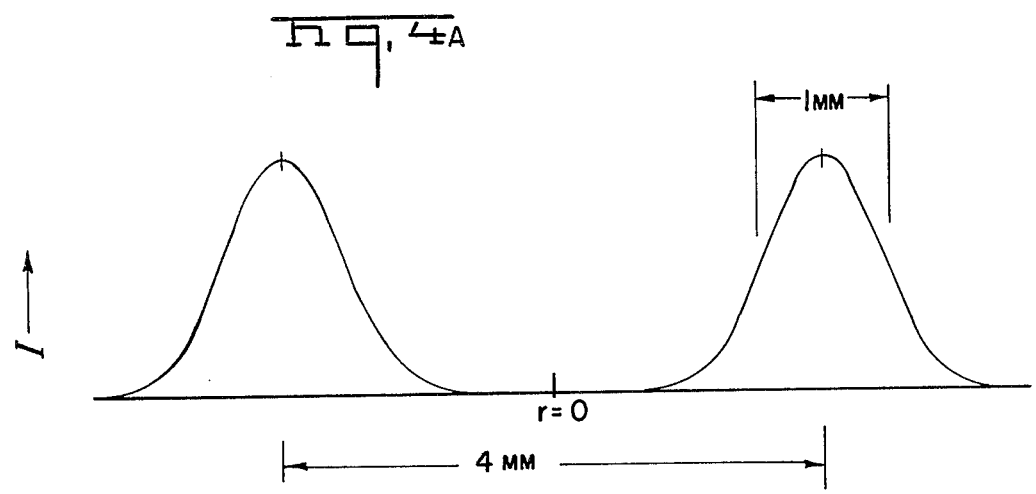
FIGS. 4A and 4B show radial power distributions of the beam which is used to heat the blank.

The reflective surfaces 24 and 28 are intended to be the primary influence in the transformation of the laser energy. Therefore, the geometry of each surface is cylindrical. If reflective surfaces 24 and 28 are circular cylinders, an incoming laser beam having a Gaussian power density distribution as a function of radius is transformed into a radial power density distribution in the vicinity of the conic reflector's axis having an essentially Gaussian distribution times some scaling factor determined by system geometry, as shown in FIG. 4A. Specifically, the radial distance from the axis to the center of the lobes is determined by the orientation of cylindrical reflective surfaces 24 and 28 with respect to the system axis.

Figure 4B:
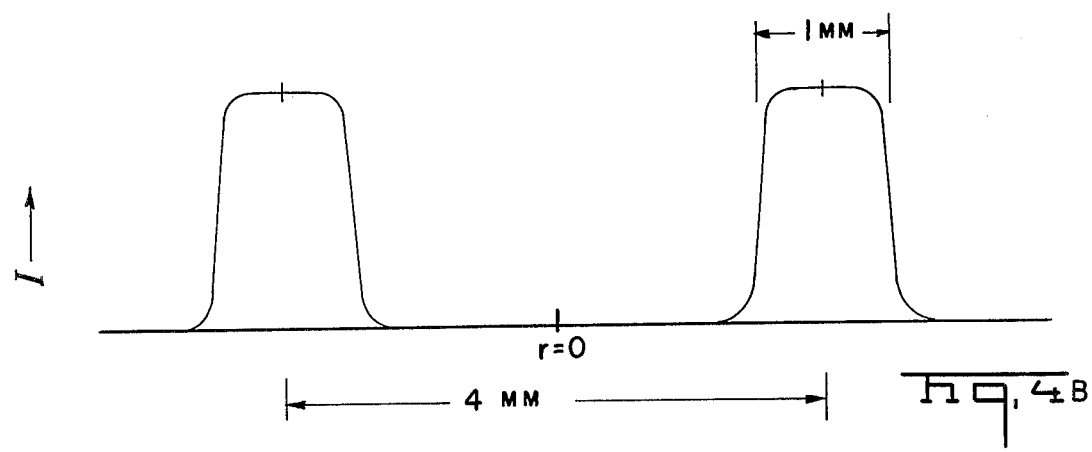

The power density distribution as a function of radius which is shown in FIG. 4B represents a more desirable condition in terms of process stability and blank-position insensitivity. This distribution is obtained when the surfaces 24 and 28 are hyperbolic cylinders. This uniform power distribution produces very efficient heating.

Figure 5:
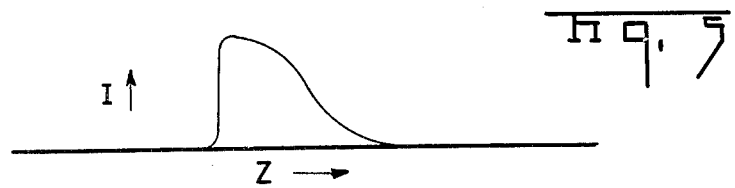
FIG. 5 shows the axial power distribution of the beam.

The axial power density distribution in the vicinity of the conic reflector's axis is influenced primarily by the shape of the surfaces of the rooftop reflector 22. If, as is generally the case, the incoming beam is circularly symmetric with a Gaussian distribution having a diameter d at the $1/e^2$ intensity points, the rooftop reflector 22 divides this beam into two beams each having a half Gaussian profile with a width of d/2. This profile is transmitted by the optical elements to the vicinity of the axis of conic reflector 25, where it appears as the power density distribution as a function of axial position z. A half Gaussian axial distribution is shown in FIG. 5.

The half Gaussian axial distribution appears to be most efficient for the drawing of optical waveguide fiber. However, modification of this characteristic is possible by the proper specification of non-planar surfaces on the rooftop reflector 22.

The present invention offers means for complete control of the size and shape of the axial power density distribution in the vicinity of the glass blank. While a half Gaussian distribution has been described, many others are possible. The system described in the cited Jaeger and Logan patent provides only a Gaussian distribution; its size can apparently be varied by certain adjustments and/or redesign.

The optical element 21 can be fabricated of any stable material which is relatively transparent at the laser's emitting wavelength and upon which a reflective coating can be applied. Examples are zinc selenide, sodium chloride, potassium chloride, and germanium.

The reflective surface 23 of element 21 can be a thin film of any material which is highly reflective at the laser's emitting wavelength. Examples are aluminum, silver, gold, and nickel.

The rooftop reflector 22 and the cylindrical reflecting surfaces 22 and 28 can be of any material which is highly reflective at the laser's emitting wavelength either because of its intrinsic reflectivity or through the application of a suitable reflective coating.

The assembly consisting of the rooftop reflector 22 and the cylindrical reflecting surfaces can rotate at any physically realizable speed which is sufficiently high to produce an effectively constant blank illumination.

The reflective surfaces of the rooftop reflector can be planar or any cylindrical shape which, by design, will yield some desired axial power density distribution.

The curvature of the reflective surfaces of the cylindrical reflectors can be circular, hyperbolic, or any shape which, by design, will yield some desired radial power density distribution.

The orientation of the cylindrical reflecting surfaces 22 and 28 can be of any design to yield a desired radial position of the lobes of the radial power density distribution.

The techniques embodied in the present invention are not limited to the production of optical waveguide by drawing from a glass blank. They are applicable to any process requiring controllable heating of a relatively small zone on the surface of a raw-material blank or pre-form, such as cutting, heat-treating, etc.

While a particular embodiment of the invention has been shown and described, various modifications are within the true spirit and scope of the invention. The appended claims are intended to cover all such modifications.

What is claimed is:

1. Apparatus for heating a blank to the drawing temperature of the materials thereof comprising:
   a source of laser radiation;
   means for splitting said radiation into beams which do not intersect the axis of said blank;
   means for forming said laser radiation into beams having a prescribed radial power density distribution in relation to said blank; and
   means for drawing said blank along the axis thereof.

2. The apparatus recited in claim 1 wherein said means for forming comprises:
   a rotating reflector forming a circumferential beam of laser radiation.

3. The apparatus recited in claim 2 wherein said rotating reflector has two surfaces which join in a line which intersects the axis of rotation.

4. Apparatus for heating an optical waveguide blank to the drawing temperature of the materials thereof comprising:
   a source of laser radiation;
   rotating means for splitting said radiation into two beams which are rotating about and which do not intersect the axis of said waveguide blank; and
   means for drawing said blank along said axis.

5. Apparatus for heating a blank to the drawing temperature of the materials thereof comprising:
   a source of laser radiation;
   a rotating reflector, radiation from said source being directed along the axis of said rotating reflector;
   means in said rotating reflector for splitting said radiation into two beams which are rotating about and which do not intersect said axis;
   means for forming said laser radiation into beams having a prescribed radial power density distribution with respect to said blank; and
   means for drawing said blank along the axis thereof.

6. The apparatus recited in claim 5 wherein said means for forming further comprises:
   a conical reflector with an axis coincident with the axis of said blank, the rotating beams of laser radiation being directed to the surface of said conical reflector.

7. The apparatus recited in claim 5 wherein said means for forming comprises two reflective surfaces rotating about the axis of said rotating reflector and spaced from said axis, said two beams being respectively incident upon said two surfaces, said reflective surfaces forming the prescribed radial power distribution.

8. The apparatus recited in claim 7 wherein said reflective surfaces are cylindrical.

9. The apparatus recited in claim 7 wherein said reflective surfaces are hyperbolic cylinders.

10. The apparatus recited in claim 6 further comprising annular mirrors between said rotating reflector and said conical reflector.

* * * * *